US012705380B2

(12) United States Patent
Rolle et al.

(10) Patent No.: US 12,705,380 B2
(45) Date of Patent: Aug. 11, 2026

(54) SAVING RESOURCES AND INCREASING COMPLIANCE FOR DATA PRIVACY INTEGRATION PROTOCOLS

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 18/937,170

(22) Filed: Nov. 5, 2024

(65) Prior Publication Data

US 2026/0127302 A1 May 7, 2026

(51) Int. Cl.
*G06F 21/62* (2013.01)
*G06F 21/50* (2013.01)

(52) U.S. Cl.
CPC .............. *G06F 21/62* (2013.01); *G06F 21/50* (2013.01)

(58) Field of Classification Search
CPC ................................ G06F 21/62; G06F 21/50
See application file for complete search history.

(56) References Cited

U.S. PATENT DOCUMENTS

| | | | |
|---|---|---|---|
| 17,186 | A | 5/1857 | Atwater |
| 17,457 | A | 6/1857 | Tidgewell |
| 7,308,704 | B2 | 12/2007 | Vogel et al. |
| 7,350,237 | B2 | 3/2008 | Vogel et al. |
| 7,831,567 | B2 | 11/2010 | Luther et al. |
| 8,566,193 | B2 | 10/2013 | Singh et al. |

(Continued)

FOREIGN PATENT DOCUMENTS

| | | |
|---|---|---|
| CA | 3096061 | 4/2023 |
| CN | 114092253 | 2/2022 |

(Continued)

OTHER PUBLICATIONS

D. N. Jutla and P. Bodorik, "PAUSE: A privacy architecture for heterogeneous big data environments, " 2015 IEEE International Conference on Big Data (Big Data), Santa Clara, CA, USA, 2015, pp. 1919-1928, doi: 10.1109/BigData.2015.7363969. (Year: 2015).*

(Continued)

*Primary Examiner* — Michael Simitoski
(74) *Attorney, Agent, or Firm* — Fish & Richardson P.C.

(57) ABSTRACT

The present disclosure involves systems, software, and computer implemented methods for data privacy. One example method includes receiving a request to export and then delete personal data for a data subject. A work package is sent to applications that requests a respective application to perform a blocking check and a data export for an object that represents the data subject. A data privacy integration service receives, from the applications, response information to the work package that includes blocking check information and personal data export information. The personal data export information is evaluated, and a determination is made that each application has completed a requested personal data export. In response to determining that each application of the multiple applications has completed the requested personal data export, the data privacy integration service evaluates blocking check information received from multiple applications to determine whether to send a blocking-related command to the multiple applications.

20 Claims, 9 Drawing Sheets

(56) References Cited

U.S. PATENT DOCUMENTS 8,874,551 B2 10/2014 Rosjat et al.
9,149,407 B2 10/2015 Hesse et al.
9,405,429 B1 8/2016 Gopalakrishnan
9,569,869 B2 2/2017 Hesse et al.
9,703,813 B2 7/2017 Hegde et al.
9,904,796 B2 2/2018 Pluder et al.
9,996,592 B2 6/2018 Hengstler et al.
10,409,790 B2 9/2019 Lehnert et al.
10,430,413 B2 10/2019 Christoph et al.
10,552,642 B2 2/2020 Rolle et al.
10,642,805 B1 5/2020 Masse
10,754,932 B2 8/2020 Wiederspohn et al.
10,776,254 B1 9/2020 Dhayanithi
10,839,099 B2 11/2020 Vogel et al.
10,909,222 B1 2/2021 Fregly et al.
11,042,654 B2 6/2021 Nos et al.
11,113,417 B2 9/2021 Rolle
11,463,416 B1 10/2022 Ashman et al.
11,481,513 B2 10/2022 Rolle
11,494,546 B2 11/2022 Rolle
11,514,065 B2 11/2022 Rolle
11,550,781 B2 1/2023 Rolle et al.
11,714,828 B2 8/2023 Rolle et al.
11,836,241 B1 12/2023 Unnikrishnan et al.
12,056,254 B2 8/2024 Vogel et al.
12,072,993 B2 8/2024 Ighoroje et al.
12,079,358 B2 9/2024 Ighoroje et al.
12,086,279 B2 9/2024 Vogel et al.
2007/0089117 A1 4/2007 Samson
2008/0060051 A1 3/2008 Lim
2008/0082538 A1 4/2008 Meijer et al.
2008/0174425 A1 7/2008 Torning
2009/0210394 A1 8/2009 Saravanan et al.
2009/0228340 A1 9/2009 Bohannon
2010/0138500 A1 6/2010 Consul et al.
2012/0036507 A1 2/2012 Jonnala et al.
2013/0347064 A1 12/2013 Aissi
2014/0032600 A1 1/2014 Sarferaz et al.
2014/0059458 A1 2/2014 Levien et al.
2014/0109238 A1 4/2014 Ravindran
2014/0172496 A1 6/2014 Rosjat et al.
2014/0188572 A1 7/2014 Hegde et al.
2014/0267770 A1 9/2014 Gervautz et al.
2014/0364983 A1 12/2014 Bildmayer et al.
2015/0113459 A1 4/2015 Hengstler et al.
2015/0242531 A1 8/2015 Rodniansky
2016/0112438 A1 4/2016 Hengstler et al.
2016/0335453 A1 11/2016 Kounga et al.
2017/0006135 A1 1/2017 Siebel et al.
2017/0034192 A1 2/2017 Schulman et al.
2017/0091479 A1 3/2017 Pluder et al.
2017/0270163 A1 9/2017 Christoph et al.
2018/0101164 A1 4/2018 Noetzelmann et al.
2018/0113811 A1 4/2018 Xing
2018/0322279 A1 11/2018 Beskorovajnov et al.
2019/0018985 A1 1/2019 Rolle et al.
2019/0197258 A1 6/2019 Acosta
2019/0236294 A1 8/2019 McDonald et al.
2019/0236334 A1 8/2019 Babushkin
2020/0019728 A1 1/2020 Rolle
2020/0133929 A1 4/2020 Yamashita et al.
2020/0184104 A1* 6/2020 Barday ............... G06F 21/6245
2020/0242233 A1 7/2020 Konoura et al.
2020/0285766 A1 9/2020 Jois et al.
2020/0293679 A1* 9/2020 Handy Bosma ........ H04L 63/10
2020/0342137 A1 10/2020 Barday et al.
2021/0051168 A1 2/2021 Mei et al.
2021/0089678 A1 3/2021 Gkoulalas-Divanis et al.
2021/0141932 A1* 5/2021 Barday ................. G06F 16/125
2021/0192052 A1 6/2021 Loch et al.
2021/0200902 A1* 7/2021 Brannon ............. G06F 21/6263
2021/0209251 A1 7/2021 Parthasarathy
2021/0350022 A1* 11/2021 Brannon ................. G06F 40/20
2022/0043917 A1 2/2022 Rolle
2022/0050834 A1 2/2022 Rolle et al.
2022/0050920 A1 2/2022 Rolle
2022/0058333 A1 2/2022 Rolle
2022/0100755 A1 3/2022 Rolle
2022/0121777 A1* 4/2022 Brannon ............. H04L 63/0407
2022/0207429 A1 6/2022 Haribhakti et al.
2022/0277023 A1 9/2022 Rolle et al.
2022/0300837 A1 9/2022 Shmelkin et al.
2022/0309052 A1 9/2022 Rolle
2022/0374339 A1 11/2022 Brown
2023/0081785 A1 3/2023 Zhang
2023/0101945 A1 3/2023 Walton et al.
2023/0176894 A1 6/2023 Rolle et al.
2023/0177180 A1 6/2023 Rolle
2023/0177182 A1 6/2023 Rolle et al.
2023/0177183 A1 6/2023 Rolle et al.
2023/0177186 A1* 6/2023 Ighoroje ........... G06F 16/24547 726/27
2023/0177189 A1* 6/2023 Ighoroje ........... G06F 16/24547 726/27
2023/0177194 A1 6/2023 Rolle et al.
2023/0177206 A1 6/2023 Rolle et al.
2023/0177213 A1 6/2023 Rolle et al.
2023/0179602 A1 6/2023 Rolle et al.
2023/0244637 A1 8/2023 Wu
2023/0247034 A1 8/2023 Vogel et al.
2023/0262094 A1 8/2023 Patnaikuni et al.
2023/0385449 A1 11/2023 Pluder et al.
2024/0134917 A1 4/2024 Hesse et al.
2024/0184895 A1 6/2024 Vogel et al.
2024/0184913 A1 6/2024 Rolle
2024/0184914 A1 6/2024 Rolle et al.
2024/0193298 A1 6/2024 Rolle et al.
2024/0241911 A9 7/2024 Hesse et al.
2024/0330506 A1* 10/2024 Xu ...................... G06F 21/6245
2025/0005190 A1 1/2025 Shmidov et al.
2025/0284840 A1 9/2025 Meriam et al.
2026/0004001 A1 1/2026 Barnes et al.

FOREIGN PATENT DOCUMENTS

CN 115809259 3/2023
EP 3553689 10/2019
IE 20190191 7/2021
KR 10-2686822 7/2024

OTHER PUBLICATIONS

Kneuper, Ralf. "Rights of Data Subjects and Their Implementation." Data Protection for Software Development and IT: A Practical Introduction. Berlin, Heidelberg: Springer Berlin Heidelberg, 2024. 107-124. (Year: 2024).*
U.S. Appl. No. 17/186,934, filed Feb. 26, 2021, Rolle et al.
U.S. Appl. No. 17/457,811, filed Dec. 6, 2021, Rolle et al.
U.S. Appl. No. 18/049,063, filed Oct. 24, 2022, Hesse et al.
U.S. Appl. No. 18/487,283, filed Oct. 16, 2023, Vogel et al.
U.S. Appl. No. 18/487,293, filed Oct. 16, 2023, Rolle et al.
U.S. Appl. No. 18/487,347, filed Oct. 16, 2023, Rolle et al.
U.S. Appl. No. 18/487,365, filed Oct. 16, 2023, Rolle et al.
U.S. Appl. No. 18/487,484, filed Oct. 16, 2023, Rolle.
U.S. Appl. No. 18/629,084, filed Apr. 8, 2024, Rolle et al.
U.S. Appl. No. 18/629,091, filed Apr. 8, 2024, Rolle et al.
U.S. Appl. No. 18/629,100, filed Apr. 8, 2024, Rolle et al.
U.S. Appl. No. 18/889,601, filed Sep. 19, 2024, Rolle et al.
U.S. Appl. No. 18/937,147, filed Nov. 5, 2024, Vogel et al.
Final Office Action in U.S. Appl. No. 17/457,811, mailed on May 21, 2024, 34 pages.
Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.
Non-Final Office Action in U.S. Appl. No. 17/457,802, mailed on Apr. 16, 2024, 17 pages.
Non-Final Office Action in U.S. Appl. No. 17/457,811, mailed on Dec. 20, 2023, 27 pages.

(56) References Cited

OTHER PUBLICATIONS

Non-Final Office Action in U.S. Appl. No. 17/702,013, mailed on Jan. 4, 2024, 9 pages.
SAP “SAP Asset Manager Security Guide” Dec. 10, 2020, 28 pages.
SAP “SAP Event Stream Processor: Security Guide” Sep. 23, 2019, 58 pages.
Wikipedia.org [online], “Hyperscale computing” created on May 2013, retrieved on Dec. 1, 2022, retrieved from URL <https://en.wikipedia.org/wiki/Hyperscale_computing>, 2 pages.
Wikipedia.org [online], “Information privacy” created on May 2003, retrieved on Dec. 6, 2021, retrieved from URL <https://en.wikipedia.org/wiki/Information_privacy>, 7 pages.
Wikipedia.org [online], “Master Data” created on Oct. 2006, retrieved on Dec. 6, 2021, retrieved from URL <https://en.wikipedia.org/wiki/Master_data>, 2 pages.
Wikipedia.org [online], “Personal Data” created on May 2005, retrieved on Dec. 6, 2021, retrieved from URL <https://en.wikipedia.org/wiki/Personal_data>, 7 pages.
Wikipedia.org [online], “Personal Identifier” created on Feb. 2007, retrieved on Dec. 1, 2022, retrieved from URL <https://en.wikipedia.org/wiki/Personal_identifier>, 3 pages.
Non-Final Office Action in U.S. Appl. No. 18/889,601, mailed on Jan. 27, 2026, 29 pages.
Non-Final Office Action in U.S. Appl. No. 18/937,147, mailed on Mar. 31, 2026, 29 pages.

* cited by examiner

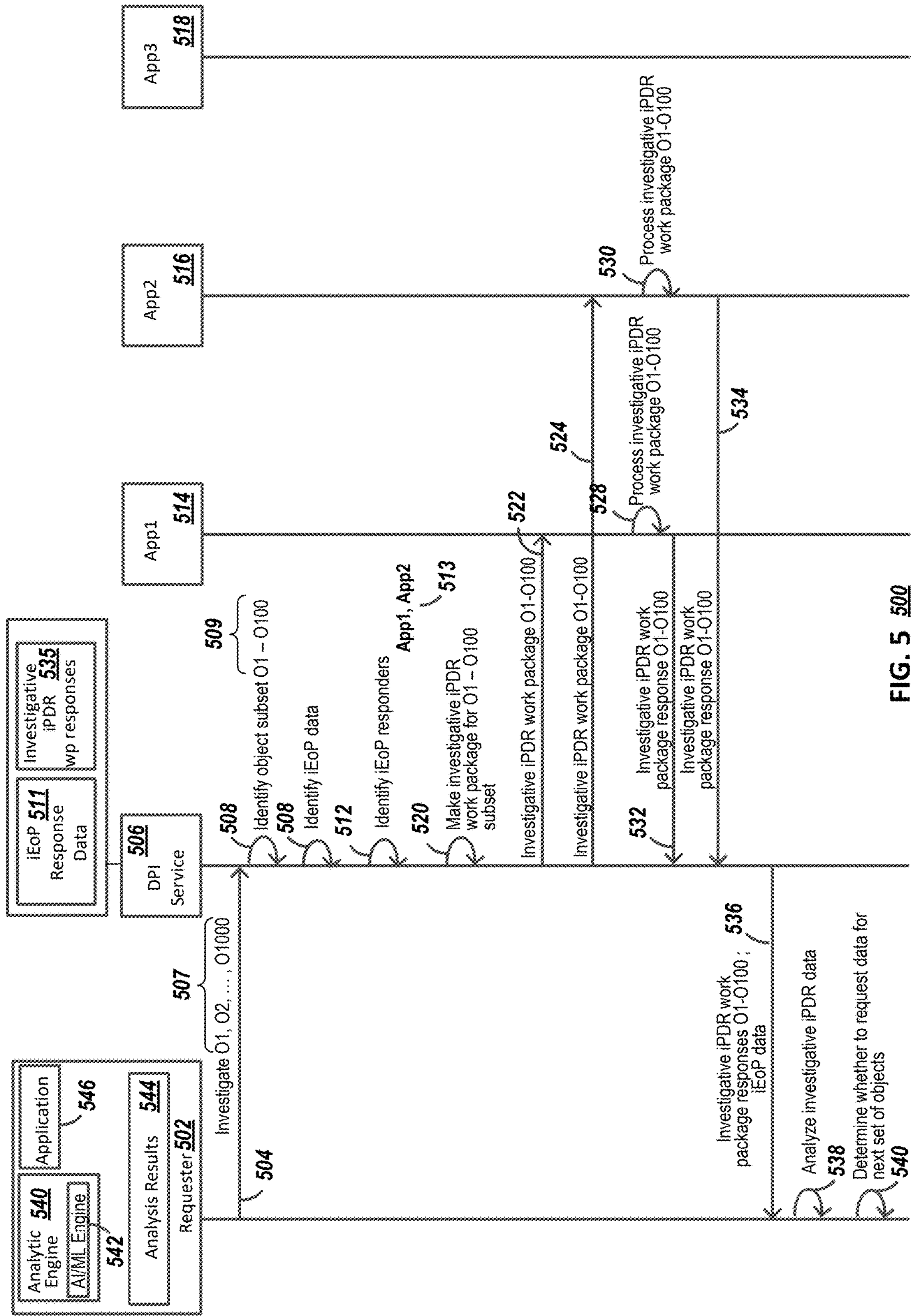
Analytic Engine 540
AI/ML Engine
542
Application
546
Analysis Results 544
Requester 502
iEoP 511 Response Data
Investigative iPDR 535 wp responses
506 DPI Service
App1 514
App2 516
App3 518
504
Investigate O1, O2, . . . , O1000
507
508
Identify object subset O1 ~ O100
509
508
Identify iEoP data
512
Identify iEoP responders
App1, App2
513
520
Make investigative iPDR work package for O1 ~ O100 subset
Investigative iPDR work package O1-O100
522
Investigative iPDR work package O1-O100
524
528
Process investigative iPDR work package O1-O100
530
Process investigative iPDR work package O1-O100
532
Investigative iPDR work package response O1-O100
Investigative iPDR work package response O1-O100
534
536
Investigative iPDR work package responses O1-O100 ; iEoP data
Analyze investigative iPDR data
538
Determine whether to request data for next set of objects
540
FIG. 5 500

SAVING RESOURCES AND INCREASING COMPLIANCE FOR DATA PRIVACY INTEGRATION PROTOCOLS

TECHNICAL FIELD

The present disclosure relates to computer-implemented methods, software, and systems for data privacy protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: receiving, at a data privacy integration service that manages data privacy protocols for applications in a multiple-application landscape, a request to export and then delete personal data for a data subject; sending, in response to the request, by the data privacy integration service and to multiple applications, a work package that requests a respective application to perform a blocking check and a data export for an object that represents the data subject; receiving, at the data privacy integration service, from the multiple applications, response information to the work package that includes blocking check information and personal data export information; evaluating, by the data privacy integration service, personal data export information received from the multiple applications; determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

Implementations can include one or more of the following features. The blocking check can be a request for an application to determine whether the object representing the data subject can or cannot be blocked in the application, wherein a veto vote for an application indicates that the application cannot block the object. Evaluating blocking check information can include determining whether any application has provided a veto vote for the object. The data privacy integration service can send, as the blocking-related command, in response to determining that each application of the multiple applications has provided a non-veto vote for the object, a block command to each of the multiple applications that instructs a respective application to block the object. Each application of the multiple applications can successfully complete the block command and delete the object after a respective retention period for the object expires. The data privacy integration service can determine to not send the block command in response to determining that at least one application has provided a veto vote for the object or that at least one application has failed to provide a vote for the object. The data privacy integration service can determine, for a first application, that the first application has not provided a veto vote based on the first application responding to the work package with an indication that the first application does not store personal data related to the data subject. The blocking check can include a purpose for which personal data may be processed and is a request for an application to determine whether the purpose can be disassociated from the object representing the data subject. The data privacy integration service can send, as the blocking-related command, in response to determining that each of the multiple applications is able to disassociate the purpose from the object, a disassociate-purpose command to each of the multiple applications that instructs a respective application to disassociate the purpose from the object. The data privacy integration service can determine to not send the disassociate-purpose command in response to determining that at least one application is not able to disassociate the purpose from the object. A first application, after disassociating the purpose from the object, can block the object based on the object no longer having any associated purposes in the first application. The data privacy integration service can receive blocking statuses from applications in response to block-related commands. The data privacy integration service can determine an overall blocking status based on received blocking statuses and can provide the overall blocking status in response to the request. The data privacy integration service can aggregate personal data for the data subject received from multiple applications and provide, in response to the request, aggregated personal data for the data subject. The data privacy integration service can receive a second request to export and then delete personal data for a second data subject. The data privacy integration service can determine that an exception condition exists for the second data subject. In response to determining that the exception condition exists for the second data subject, the data privacy integration service, can send, in response to the second request, a response to the second request indicating that the request to export and then deleted personal data for the second data subject cannot be completed. Determining that the exception condition exists for the second data subject can include determining, by the data privacy integration service, that a litigation hold exists for the second data subject that prevents deletion of personal data for the second data subject. The data privacy integration service can determine, in response to the request, that at least one blocking protocol is in progress for the data subject in the multiple-application landscape. The data privacy integration service can send a command to multiple applications to stop the blocking protocol for the data subject. The data privacy integration service can determine that each application has stopped the blocking protocol. The data privacy integration service can determine to send the work package that requests each application to perform the blocking check and the data export based on determining that each application has stopped the blocking protocol. Determining, by the data privacy integration service, that at least one blocking protocol is in progress for the data subject can include: determining that a first application has, as part of a blocking protocol, blocked but not deleted the object; and determining that a second application has, as part of the blocking protocol, blocked and also deleted the object. The data privacy integration service can send an unblock command for the object to the first application and a redistribute object command for the object to a distribution service requesting the distribution service to redistribute the object to the second application. The data privacy integration service can include, in response to the request, the object representing the data subject on a hold list that prevents initiation of a blocking protocol for the data subject while the request is being processed.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 illustrates a swim lane diagram of an example process for investigating data privacy integration protocols.

DETAILED DESCRIPTION

Figure 1:
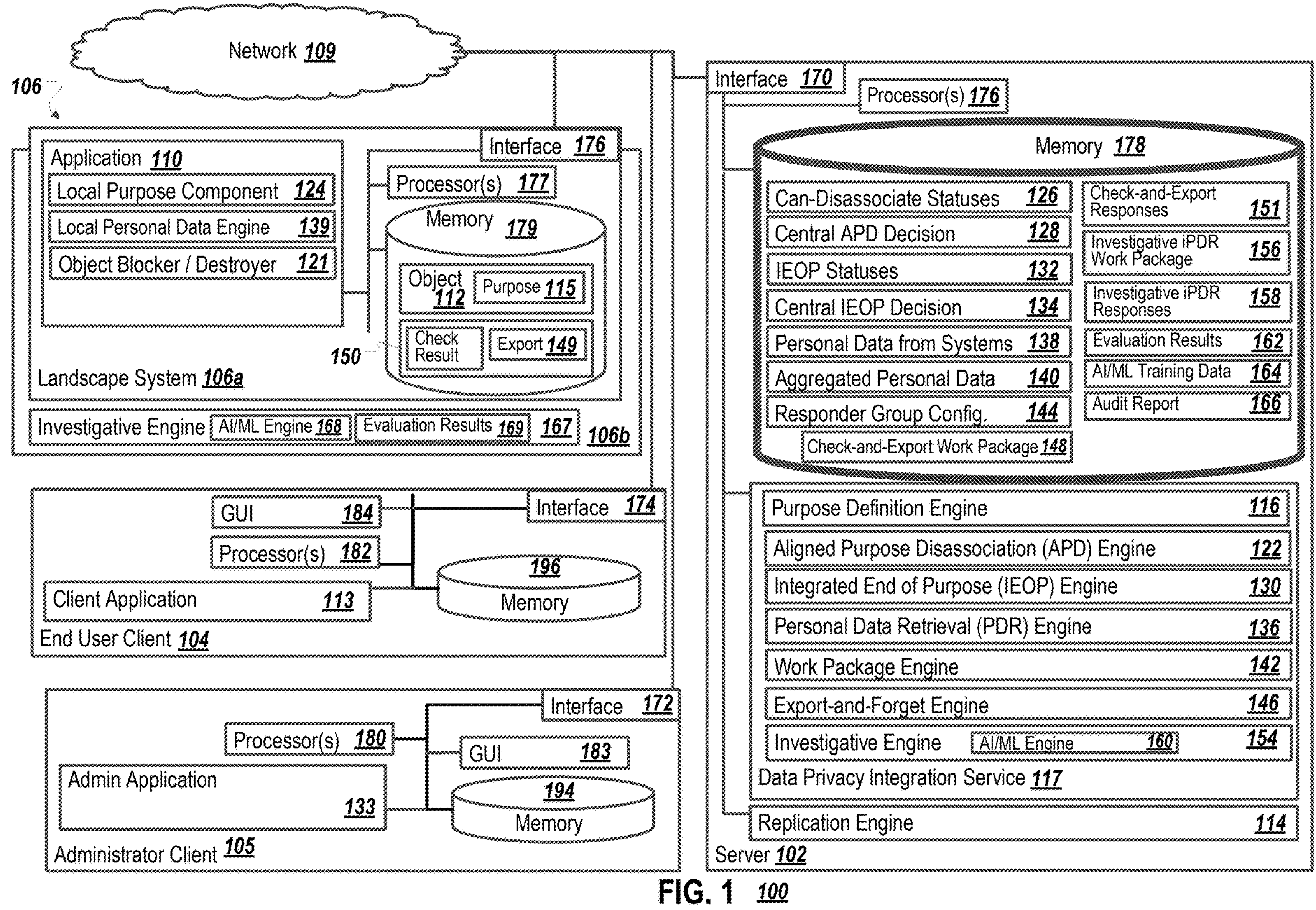
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group. Use of responder groups (and use of the DPI service in general) can involve various types of DPI work packages and work package responses sent by different responders. Responder groups and work packages are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

The DPI service can be improved in other various ways to more efficiently handle certain situations or uses cases. For example, data subjects may tend to exercise several data subject rights together at a same point in time, where an order of processing is important for the DPI service to adhere to the specifics of the request and to be in compliance with data privacy regulations. For example, a data subject may request both 1) a right of access, including a copy of personal data under processing by a data controller; and 2) deletion of the personal data after the personal data is exported. To comply with such a combined request, the data controller should handle the request so that 1) the personal data is not deleted before the data export occurs; 2) the requested personal data is exported; and 3) the personal data is deleted after the export has occurred. As described above, the data controller may have a multiple-application landscape with disparate and varying types of applications. The DPI service can be enhanced with new work package types to ensure that personal data export and personal data blocking/deletion activities performed in response to the combined request are coordinated and synchronized. Accordingly, the DPI service can increase a level of overall data privacy regulation compliance, by ensuring that a data export is completed before a deletion portion of the combined request ensues. Additionally, by improving the DPI service to handle combined requests, technical efficiencies and resource savings can be achieved. For instance, the DPI service can send a work package that requests both a data export and a local blocking-related check such as a block check or a disassociate purpose check. Accordingly, the DPI service can avoid sending, receiving, and evaluating separate work package responses. The DPI service can send blocking-related commands (e.g., block object, disassociate purpose from object) if there is a can-block or can-disassociate-purpose consensus in the landscape, respectively, and if the data export has completed.

The DPI service can perform other types of combined approaches for DPI protocols. For example, a customer of service provider that offers multiple applications in a landscape, where the applications are integrated in part via a data privacy integration service, may encounter challenges in understanding or learning why a given object is either blocked or not blocked in some situations or circumstances. Manually investigating transactional documents in each different application might not be possible or practical, for example. For instance, different applications may use different technology stacks and use different mechanisms for blocking, different systems may have different tools or administrators for configuring blocking settings or capabilities, etc. Accordingly, results or correctness of blocking, particularly with regards to data privacy integration protocols can be hard to test.

The DPI service and corresponding protocols can be enhanced to provide support for an investigative protocol which combines aspects of the iPDR protocol and the iEoP or APD protocols. Responses to iPDR work packages can be enhanced, in what can be referred to as an investigative iPDR protocol, to include local configuration rules or configuration settings used by a given application, for example. The investigative iPDR protocol can be ran and results of the investigative iPDR protocol can be evaluated, including by artificial intelligence/machine learning engines, with respect to iEoP or APD protocol results. The investigative protocol can enable customers to better understand DPI-related results, such as why some objects were blocked and some objects were not blocked after DPI protocol runs.

The investigative protocol can be used to determine whether decentralized configurations in respective applications in the broader landscape are correct and to adjust systems accordingly. Therefore, customers can achieve a higher level of compliance with data privacy regulations through an automated approach. Integrating and combining the iPDR protocol with other protocols can be performed in a streamlined fashion that saves resources as compared to independent, separate protocol runs of the different protocols. In some examples, the DPI service can request that applications provide metadata in response to an investigative iPDR work package rather than a full data export. Investigative protocol runs can be performed for an object or a set of objects. A set of objects may be evaluated as part of an audit process, for example. In some examples, the investigative iPDR protocol can be performed during and/or after setup and testing of implementation of the iEoP and/or APD protocols in a landscape.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106 (e.g., including a landscape system 106*a* and a landscape system 106*b*), and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned purpose disassociation (APD) approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End of Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval (PDR) engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

An export-and-forget engine 146 can handle a specific type of export-and-forget work package that represents a request to both export and then block personal data for a data subject. The introduction of the specific export-and-forget work package type can add efficiencies and increase coordination with respect to data privacy compliance, as mentioned above and described in more detail below.

For example, the DPI service 117 can receive a request to export and then delete personal data for a data subject. The work package engine 142 can create a check-and-export work package 148 that requests a respective system or application to perform a blocking check and a data export for an object that represents the data subject. The DPI service 117 can send the check-and-export work package 148 to the landscape systems 106. A given landscape system 106 such as the landscape system 106*a* can perform both an iPDR export (e.g., resulting in a personal data export 149) and an iEoP check (e.g., resulting in an iEoP check result 150).

The DPI service 117 can receive, from multiple landscape systems 106, check-and-export responses 151 to the check-and-export work package 148 that each can include both blocking check information and personal data export information. The export-and-forget engine 146 can evaluate personal data export information received from the landscape systems 106 to determine whether each landscape system 106 that was sent the check-and-export work package 148 has completed a requested personal data export. The iEoP engine 130 can, in response to the export-and-forget engine 146 determining that each landscape system 106 has completed the requested personal data export, evaluate blocking check information received from the landscape system 106 to determine whether to send a block command to the landscape systems, as described above. Thus data export and blocking activities can be coordinated and streamlined, resulting in resource savings and increased compliance. Similar types of coordination can be used between the export-and-forget engine 146 and the APD engine 122. For example, the APD engine 122 can send a command to disassociate a purpose from an object to the landscape systems 106 only if each landscape system 106 has finished a requested data export and has indicated an ability to disassociate the purpose from the object. The export-and-forget engine 146 is described in more detail below with respect to FIGS. 2A, 2B, 3A, 3B, and 6.

The DPI service 117 can be involved in other combinations of protocols or protocols results for various purposes. For example, the DPI service 117 can include an investigative engine 154 that can be used to coordinate a running of an investigative iPDR protocol run and analyzing iPDR data against iEoP or APD data for determining why certain iEoP or APD results happened and/or to troubleshoot or identify issues with landscape systems 106 with respect to the iEoP or APD protocols.

For example, the DPI service 117 can receive an investigative request, such as from the landscape system 106*b*, another system or application, or from an internal trigger source, to perform an investigative iPDR protocol, such as to verify results of run(s) of a data privacy integration protocol such as iEoP or APD. The investigative engine 154 can identify response data for the DPI protocol associated with the investigative request, such as the can-disassociate statuses 126 or the iEoP statuses 132 (and/or other response data for a respective protocol). The investigative engine 154 can also identify which landscape systems 106 provided the response data for the DPI protocol. The investigative engine 154 can create an investigative iPDR work package 156 that requests a given landscape system 106 to generate a personal data export in response to the investigative iPDR work package 156. The investigative engine 154 can send the investigative iPDR work package 156 to the landscape systems 106 that provided the response data for the DPI protocol under investigation.

Each landscape system 106 can process a received investigative iPDR work package 156 using the local personal data engine 139. The investigative engine 154 can receive investigative iPDR responses 158 from the landscape systems 106. The investigative engine 154 (e.g., an included AI/ML engine 160) can automatically evaluate the investigative iPDR responses 158 to determine evaluation results 162. The evaluation results 162 can include, for example, information regarding why some objects were blocked and some objects were not blocked after the DPI protocol run, whether configurations in respective landscape systems 106 appear correct, etc. The AI/ML engine 160 can be trained with AI/ML training data 164 from prior DPI protocol runs in systems known to be correctly configured and compliant with data privacy regulations, for example.

The DPI service 117 can provide the evaluation results 162 (which can in some cases be provided as an audit report 166) to a requester, such as the landscape system 106*b*. The landscape system 106*b* can include an investigative engine 167 which can enable an administrator to view presented evaluation results, for example. In some cases, the investigative engine 167 includes an AI/ML engine 168 that can also or alternatively perform analysis of investigative iPDR data and DPI protocol results, in conjunction with or in place of analysis performed by the AI/ML engine 160. For example, the DPI service 117 can provide the investigative iPDR responses 158 and the identified DPI protocol response data to the landscape system 106*b*, and the AI/ML engine 168 can determine local evaluation results 169 (which can be presented in the administrative application, for example). Investigative iPDR processing is described in more detail below with respect to FIGS. 4, 5, and 7.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106*a*, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2A:
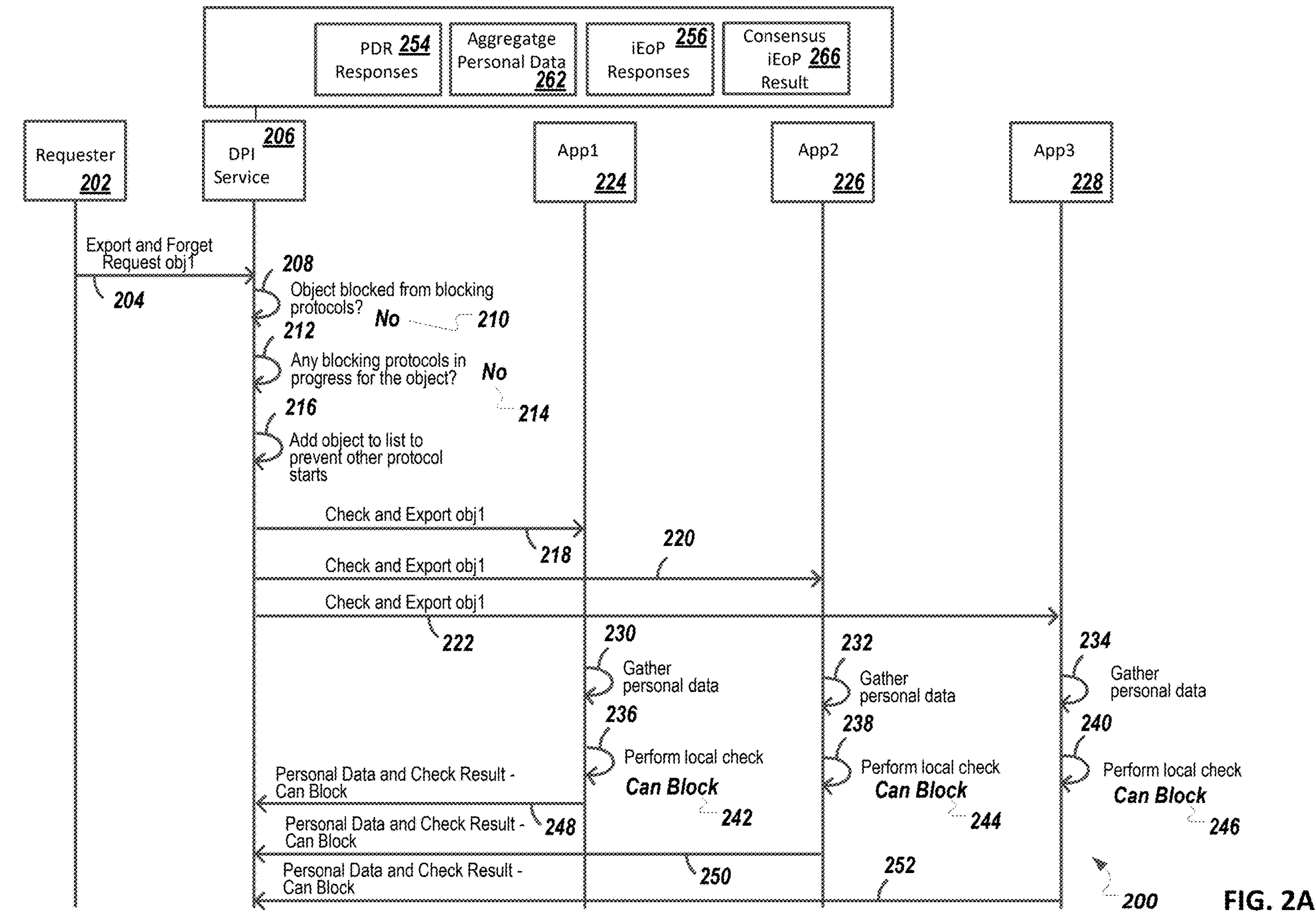
FIGS. 2A-B illustrate a swim lane diagram of an example process for a combined personal data export and end of purpose protocol.
Figure 2B:
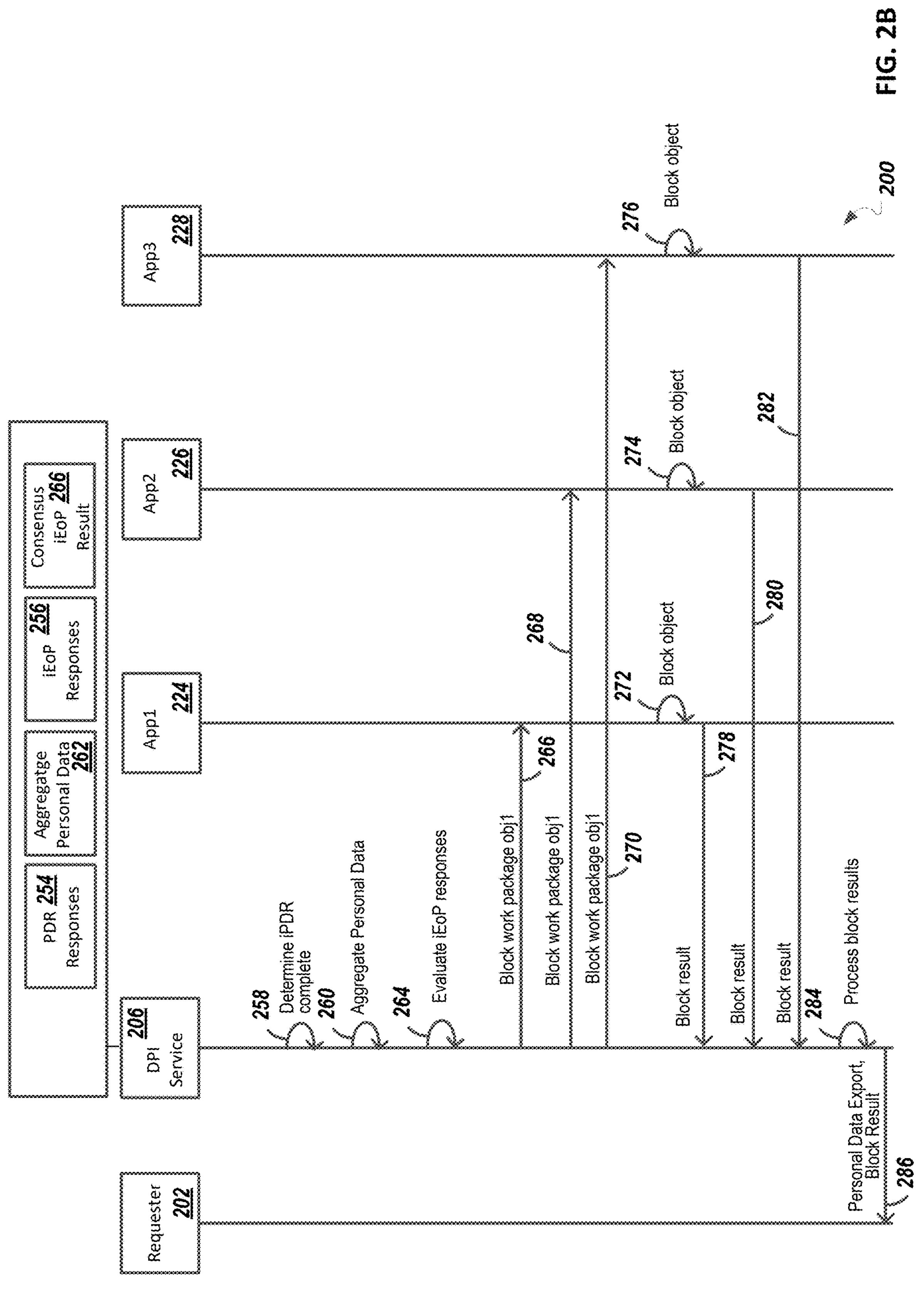

FIGS. 2A-B illustrate a swim lane diagram of an example process 200 for a combined personal data export and end of purpose protocol.

A requester 202 sends an export-and-forget request 204 for an object to a DPI service 206. At 208, the DPI service 206 determines whether the object is blocked from blocking protocols (or whether any other exception condition exists for the object that might prevent creation of an export-and-forget ticket). For example, the object might be on a list of objects for which a litigation hold applies. If an exception condition exists for the object, the DPI service 206 can generate an alert or send a message to an administrator, etc., and respond to the requester 202 indicating that the export-and-forget request 204 cannot currently be processed. In the illustrated example, however, the DPI service 206 determines a result of No 210 regarding the object being blocked from blocking protocols.

At 212, the DPI service 206 determines whether any blocking protocols are in progress for the object. In this example, the DPI service 206 determines a result of No 214 indicating no blocking protocols are in progress for the object. FIG. 3 below illustrates a different example in which a blocking protocol is in progress for an object for which an export and forget request is received.

At 216, the DPI service 206 adds the object to a list so that the DPI service 206 can prevent starting of other protocol runs for the object while the export-and-forget ticket processing is in progress for the object.

At 218, 220, and 222, the DPI service 206 sends a check-and-export work package for the object to a first application 224, a second application 226, and a third application 228, respectively. The check-and-export work packages request respective applications to perform both a personal data export and a local end of purpose check for the object.

At 230, 232, and 234, the first application 224, the second application 226, or the third application 228 each gather personal data for the object, respectively.

At 236, 238, and 240, the first application 224, the second application 226, or the third application 228 each perform a local end of purpose check for the object, respectively. For example, the first application 224 determines a result 242 of can-block, the second application 226 determines a result 244 of can-block, and the third application 228 determines a result 246 of can-block.

At 248, 250, and 252, the first application 224, the second application 226, and the third application 228 each respectively send, to the DPI service 206, a check-and-export response that includes respective exported personal data from a respective application and a respective can-block local end of purpose check result. The DPI service 206 can extract the received respective personal data exports as PDR responses 254 and extract the received local end of purpose check results as iEoP responses 256.

At 258, the DPI service 206 determines that the iPDR portion of the check-and-export processing is complete (e.g., that a personal data export has been received from each responder application, including the first application 224, the second application 226, and the third application 228).

At 260, the DPI service 206 aggregates personal data in the PDR responses 254 to create aggregated personal data 262 (e.g., by performing PDR protocol processing). Aggregation can be performed as described in the incorporated U.S. patent application Ser. No. 17/457,811 for the iPDR protocol.

At 264, the DPI service 206 evaluates the iEoP responses 256 to determine a consensus iEoP result 266 that indicates that all responder applications can block the object.

At 266, 268, and 270, the DPI service 206 sends, in response to determining the consensus iEoP result 266, a block work package for the object to the first application 224, the second application 226, and the third application 228, respectively. The block work packages instruct respective applications to locally block the object.

At 272, 274, and 276, the first application 224, the second application 226, or the third application 228 each locally block the object, respectively.

At 278, 280, and 282, the first application 224, the second application 226, or the third application 228 each send, to the DPI service 206, a block result, respectively.

At 284, the DPI service 206 processes received block results. In this example, each application was able to successfully block the object so the DPI service 206 can determine an overall block result of the object blocked in all responders. In a scenario in which not all applications were able to successfully block the object, the DPI service 206 can initiate appropriate unblock and redistribution procedures.

At 286, the DPI service 206 sends, to the requester 202, a personal data export that includes the aggregated personal data 262 and the overall block result. The DPI service 206 can remove the object from the list the object was added to at step 216.

Figure 3A:
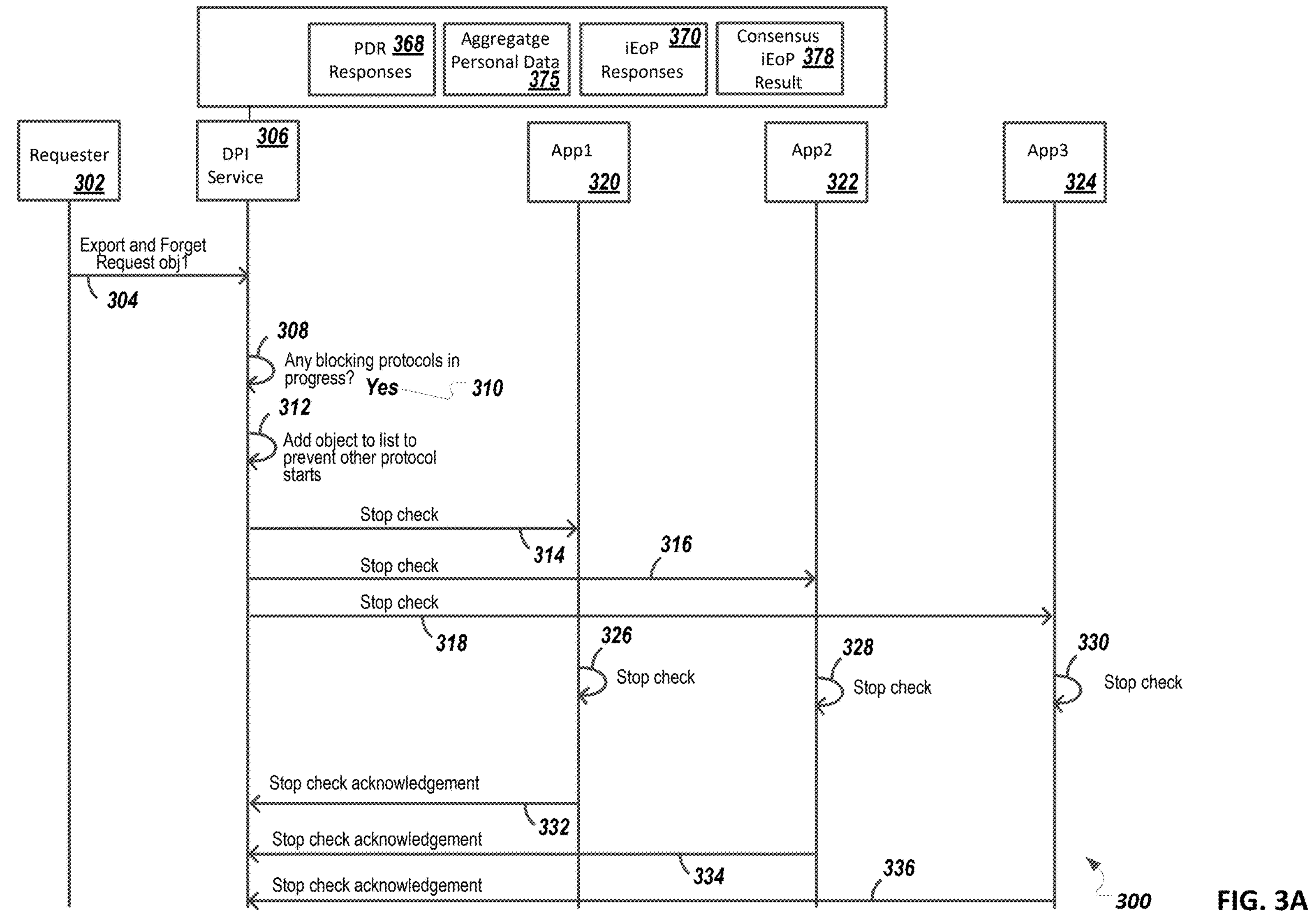
FIGS. 3A-B illustrate a swim lane diagram of an example process for a combined personal data export and end of purpose protocol.
Figure 3B:
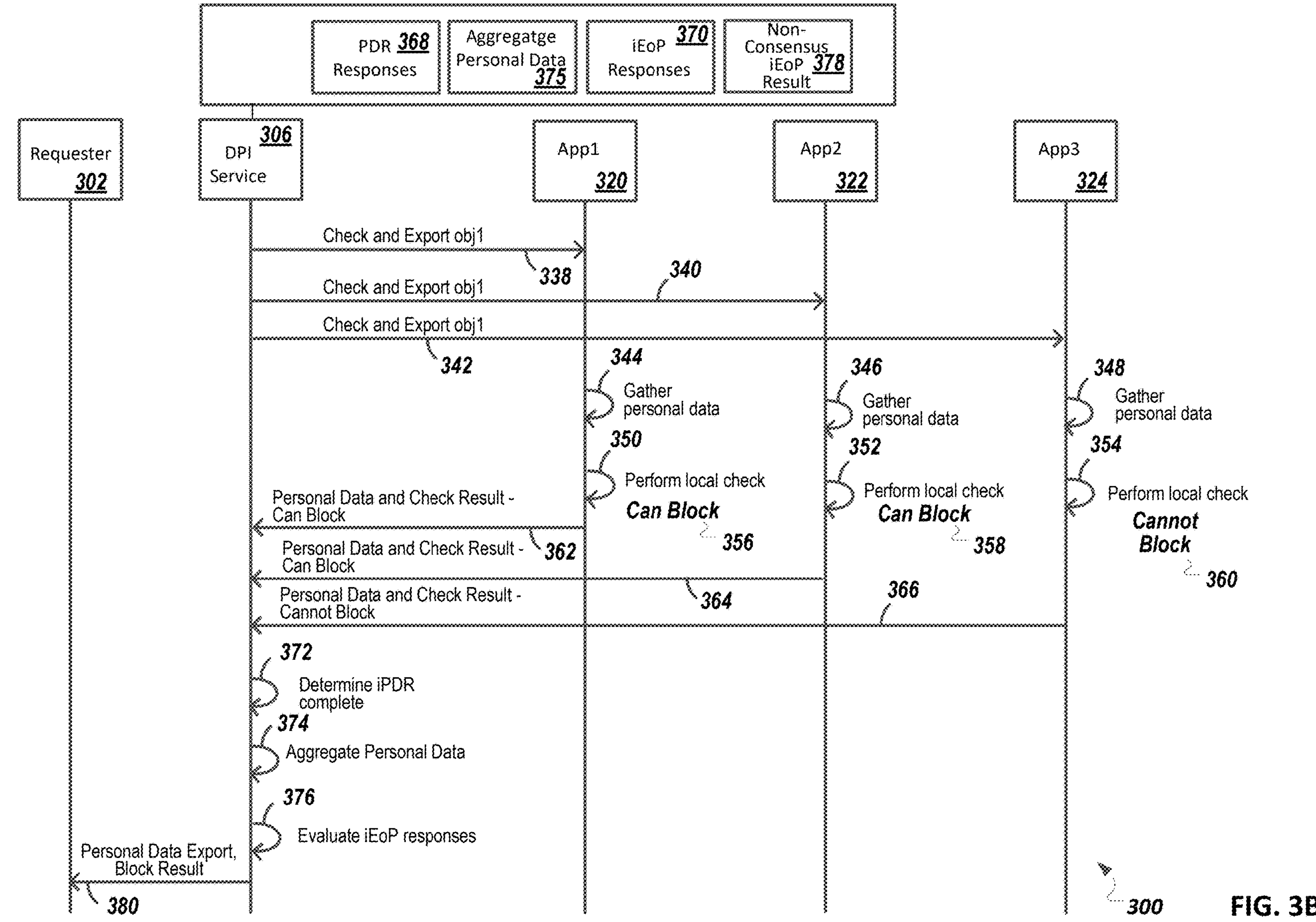

FIGS. 3A-B illustrate a swim lane diagram of an example process 300 for a combined personal data export and end of purpose protocol.

Similar to the example of FIGS. 2A-B, a requester 302 sends an export-and-forget request 304 for an object to a DPI service 306.

At 308, the DPI service 306 determines whether any blocking protocols are in progress for the object. In this example, the DPI service 306 determines a result of Yes 310 indicating that a blocking protocol (e.g., an iEoP run) is in progress for the object.

At 312, the DPI service 306 adds the object to a list so that the DPI service 306 can prevent starting of other protocol runs for the object while the export-and-forget ticket processing is in progress for the object.

At 314, 316, and 318, the DPI service 306, in response to determining the result of Yes 310 indicating that an iEoP run is in progress for the object, sends a stop-check work package for the object to a first application 320, a second application 322, and a third application 324, respectively. The stop-check work packages request respective applications to stop any local end of purpose checks that are in progress for the object. At 326, 328, and 330, the first application 320, the second application 322, or the third application 324 each perform processing to stop any local processing that may have been in progress for performing a local end of purpose check, respectively. If the DPI service 306 determines that other DPI activity is partially in progress, the DPI service 306 can send an appropriate work package to halt or undo that progress, such as a stop block, unblock, or redistribute command.

The DPI service 306 can be configured to stop in-progress blocking protocols when receiving the export-and-forget request 304 which can increase data privacy compliance in some cases. For instance, stopping of in-progress blocking protocols can ensure that data that should be exported to the data subject for the export portion of the export-and-forget request 304 is not deleted after the data controller receives the export-and-forget request 304. For instance, some courts may have identified a non-compliant approach of continuing the in-progress blocking protocol (which may lead to data deletion) and then responding to the export portion of the data subject export-and-forget request 304 with an indication that such data can no longer be exported. Stopping in-progress blocking protocols can remove such a non-compliance or legal risk for the data controller in certain situations. In general, a level of data privacy compliance can be increased in some cases by stopping any running protocols, and in other cases stopping running protocols might not be required and an already-running protocol can either: (1) finish first before a new ticket gets executed; or (2) run in parallel with a new ticket.

At 332, 334, and 336, the first application 320, the second application 322, or the third application 324 each send, to the DPI service 306, an acknowledgment indicating receipt and handling of the stop check work package, respectively.

At 338, 340, and 342, the DPI service 306 sends a check-and-export work package for the object to the first application 320, the second application 322, and the third application 324, respectively. The check-and-export work packages request respective applications to perform both a personal data export and a local end of purpose check for the object.

At 344, 346, and 348, the first application 320, the second application 322, or the third application 324 each gather personal data for the object, respectively.

At 350, 352, and 352, the first application 320, the second application 322, or the third application 324 each perform a local end of purpose check for the object, respectively. For example, the first application 320 determines a result 356 of can-block, the second application 322 determines a result 358 of can-block, and the third application 324 determines a result 360 of cannot-block.

At 362, 364, and 366, the first application 320, the second application 322, and the third application 324 each respectively send, to the DPI service 306, a check-and-export response that includes respective exported personal data from a respective application and a respective local end of purpose check result (e.g., can-block or cannot-block, as determined by the respective application). The DPI service 306 can extract the received respective personal data exports as PDR responses 368 and extract the received local end of purpose check results as iEoP responses 370.

At 372, the DPI service 306 determines that the iPDR portion of the check-and-export processing is complete (e.g., that a personal data export has been received from each responder application, including the first application 320, the second application 322, and the third application 324).

At 374, the DPI service 306 aggregates personal data in the PDR responses 368 to create aggregated personal data 375 (e.g., by performing PDR protocol processing).

At 376, the DPI service 306 evaluates the iEoP responses 370 to determine a non-consensus iEoP result 378 that indicates that not all responder applications can block the object (e.g., based at least on the result 360 determined by the third application 324).

At 380, the DPI service 306 sends, to the requester 304, a personal data export that includes the aggregated personal data 375 and an indication that the object cannot currently be blocked due to a lack of overall end of purpose for the object in the landscape. Although the object cannot currently be deleted, the DPI service 306 can remove the object from the list the object was added to in step 312, so that the DPI service 306 can accept and process future blocking protocol requests for the object (e.g., that may be received at a later time when the object might then be able to be deleted).

Figure 4:
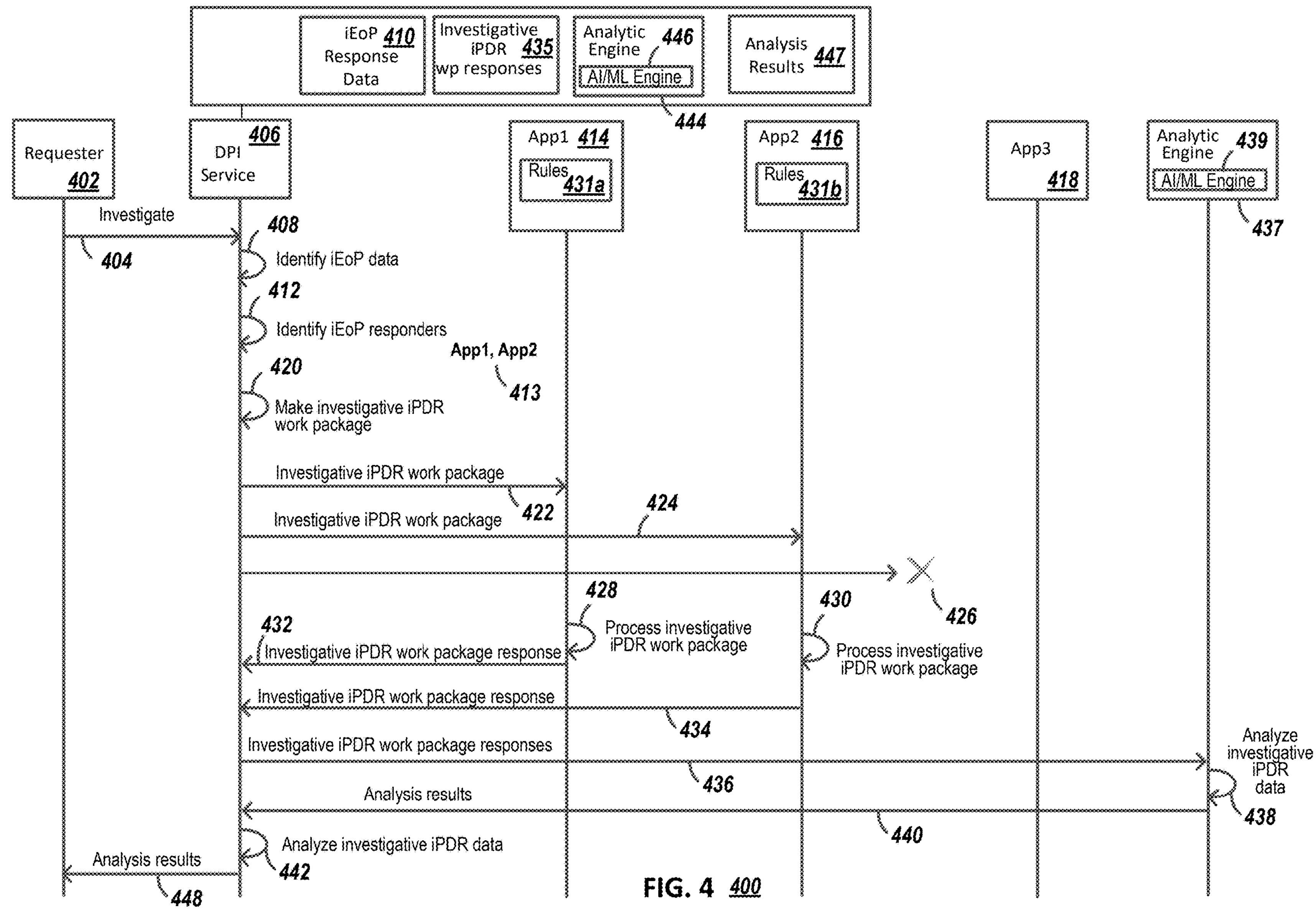
FIG. 4 illustrates a swim lane diagram of an example process for investigating data privacy integration protocols.

FIG. 4 illustrates a swim lane diagram of an example process 400 for investigating data privacy integration protocols.

A requester 402 (e.g., requesting application or system) sends a request 404 to a DPI service 406 that requests an investigative analysis for analyzing DPI processing. The requester 402 can send the request 404 in response to an administrator input or automatically as part of periodic automatic processing, for example. As another example, automated processing can occur automatically to investigate a certain percentage (e.g., 1%) of historical DPI tickets or requests). The requester 402 can be a dedicated service, in some implementations (e.g., rather than a regular responder application).

In some cases, the request 404 includes a flag indicating that the request 404 is for investigative purposes (e.g., as compared to a regular iPDR protocol run). For instance, the request 404 can include a flag such as "internal_investigation=true." In some implementations, the requester 404 can include a flag that indicates a prior iEoP protocol run for which an investigation is requested. For instance, the requester 402 can include a flag in the request 404, such as "basis_ticket=123456_ABCDE_789," which indicates a ticket identifier of a prior iEoP protocol run.

At 408, the DPI service 406 identifies iEoP response data 410 from one or more protocol runs for iEoP protocol requests. For example, the DPI service 406 can identify iEoP response data corresponding to a prior iEoP protocol run that is identified based on information (e.g., a ticket identifier) in the request 404. As another example, in some implementations, the DPI service 406 can, in response to the request 404, initiate a new iEoP protocol run for one or more objects, receive and gather responses from relevant applications as the iEoP response data 410, and then identify the iEoP response data 410 for purposes of evaluation in response to the request 404.

At 412, the DPI service 406 identifies responder applications that responded to the iEoP protocol runs associated with the iEoP response data 410. For example, the DPI service 406 identify, as relevant responders 413, a first application 414 and a second application 416 but not a third application 418 (e.g., the third application 418 may not have responded for various reasons, such as use of responder groups or other approaches).

At 420, the DPI service 406 creates an investigative iPDR work package for use in investigating the prior iEoP protocol runs. In some implementations, the investigative iPDR work package includes a flag that can indicate to responders to provide certain metadata rather than providing "all personal data stored concerning a data subject corresponding to a certain object" as may be done for regular iPDR processing. For example, a flag (e.g., "provide-metadata") in the investigate iPDR work package can correspond to a request to responders to "return metadata about personal data stored concerning a certain data subject object." Metadata can include, for example, a number and type of transactional documents referencing the data subject object, created and last-changed-on timestamps, retention period information, etc. Providing metadata rather than a full data export can reduce an amount of transferred data and an amount of data processed by both the responders and the DPI service 405. Provided metadata can be sufficient to identify meaningful analysis results.

The DPI service 406 sends investigate work package copies 422 and 424 to the first application 414 and the second application 416, respectively. The DPI service 406 does not send the investigative iPDR work package to the third application 418, as illustrated by a symbol 426. The DPI service 406 can save resources by only sending the investigative iPDR work package to applications included in the relevant responders 413 as compared to sending the investigative iPDR work package to all responders in the landscape, for example.

At 428 and 430, the first application 414 and the second application 416, respectively, process the investigative iPDR work package by performing iPDR processing according to any flag, options, or other content in the investigative iPDR work package. For example, if the work package includes a flag requesting export metadata rather than a full export, a responder can generate and/or identify metadata. If the work package does not include a flag requesting metadata, the responder can generate a full data export in accordance with the iPDR protocol. The first application 414 and the second application 416 can each include in respective investigative iPDR work package responses, respective sets of exported data.

A given application can also include, in respective investigative iPDR work package responses, information for exported data items that indicates whether each respective item is currently blocked. In some cases, a respective application includes a blocked indicator for items that are blocked and no indicator for items that are not blocked. As another example, each application can also include, in respective investigative iPDR work package responses, application configuration or rule information indicating how the application handles DPI protocols such as iEoP and/or APD, such as retention period information for respective objects. For example, the first application 414 or the second application 416 can include, in a respective investigative iPDR work package response, local rule information 431*a* or 431*b*, respectively. The local rule information 431*a* and 431*b* can include retention period information, rules for assigning retention periods to different types of data or objects, etc.

At 432 and 434, the first application 414 and the second application 416, respectively, each send an investigative iPDR work package response to the DPI service 406. The DPI service 406 stores received investigative iPDR work package responses as investigative iPDR work package responses 435.

At 436, the DPI service 406 provides the investigative iPDR work package responses 435 and the iEoP response data 410 to an analytic engine 437 (e.g., an evaluator). At 438, the analytic engine 437 analyzes the investigative iPDR work package responses 435 and the iEoP response data 410. In some cases, the analytic engine 437 includes an AI/ML engine 439 and the analytic engine 437 analyzes the investigative iPDR work package responses 435 and the iEoP response data 410 using the AI/ML engine 439. In some cases, the analytic engine 437 provides at least some of the investigative iPDR work package responses 435 and the iEoP response data 410 to an expert and receives feedback on the investigative iPDR work package responses 435 and/or the iEoP response data 410 from the expert.

The analytic engine 437 provides, to the DPI service 406, analysis results 440 obtained from analysis of the investigative iPDR work package responses 435 and the iEoP response data 410.

The analytic engine 437 can be a system separate from the DPI service 406, as shown. At 442, in some implementations, the DPI service 406 also or alternatively performs internal analysis of the investigative iPDR work package responses 435 and/or the iEoP response data 410. For example, the DPI service 406 can use an internal analytic engine 444 to analyze the investigative iPDR work package responses 435 and the iEoP response data 410. In some cases, the internal analytic engine 444 includes an AI/ML engine 446 and the internal analytic engine 444 analyzes the investigative iPDR work package responses 435 and the iEoP response data 410 using the AI/ML engine 446. In some cases, the internal analytic engine 444 provides at least some of the investigative iPDR work package responses 435 and the iEoP response data 410 to an expert and receives feedback on the investigative iPDR work package responses 435 and/or the iEoP response data 410 from the expert. The DPI service 406 can store analysis results 447 obtained from internal and/or external analysis of the investigative iPDR work package responses 435 and the iEoP response data 410.

Analysis of investigative iPDR work package responses and corresponding iEoP response data 410, by the analytic engine 437 or the analytic engine 444, can include various types of analysis. For example, a given analytic engine can determine, for objects included in the iEoP response data 410, that an object was blocked in an application because all transactional data items for the object included in or referenced by the investigative iPDR work package responses have transaction dates that are older than corresponding retention periods configured for the transactional data items in the application. As another example, a given analytic engine can determine, for objects included in the iEoP response data 410, that an object was not blocked in an application because not all relevant retention periods have expired.

The analytic engine 437 and/or the analytic engine 444 can identify errors or inconsistencies which may reflect configuration issues in a given application, such as by identifying an unblocked object that should have been blocked because relevant retention periods have expired a long enough time ago that the application should have blocked the object. The analytic engine 437 and/or the analytic engine 444 can identify other potential misconfiguration issues, such as data of a certain data type for which retention periods are out of line with typical retention periods used for the data type.

In some examples, the analytic engine 437 and/or the analytic engine 444 can identify appropriate adjustments to DPI configuration(s) to correct any identified misconfigurations. For example, the analytic engine 437 and/or the analytic engine 444 can determine how much transactional data is linked to master data objects per system. In some cases, an average amount of transactional data per system can be determined (e.g., the analytic engine 437 and/or the analytic engine 444 can determine, from a list of object instance identifiers from a work package, that each object is on average associated with a certain number of transactional objects). In other cases, an associated transactional document amount distribution can be determined per object (e.g., for each object instance identifier from the work package, a specific amount of transactional documents can be determined). In other examples, meta information can be determined and attached to the transactional information (e.g., indicating how much time it took to identify all relevant transactional documents, how much computing power was used, etc.). The meta information can be used to determine a responder group configuration. For example, applications with a higher resource consumption for a determination of a DPI status can be placed in later responder groups.

As another example, through analysis of investigative work package responses, the analytic engine 437 and/or the analytic engine 444 can determine that for some applications, an amount of transactional data per object may grow greater than a certain threshold and the analytic engine 437 and/or the analytic engine 444 can determine that a timeout configuration adjustment is appropriate (e.g., to provide that application more time to complete check work packages). In some cases, the result of an investigative work package can be shown to an administrator who can determine a configuration adjustment. In some examples, investigative work package results are stored and the analytic engine 437 and/or the analytic engine 444 (or another analysis engine) can identify certain trends over time. In some cases, a data controller (e.g., an organization that uses the DPI service 406) can agree to share metadata from a local analytical system anonymously with a provider of the DPI service 406, to enable comparison (and sharing of anonymous comparison results) between data controllers. A particular data controller (e.g., an analysis engine or an administrator) may thus be enabled to identify, that although the data controller has less transactional documents in instance(s) of application(s) than those of other data controllers, the data controller for some reason takes on average more time to process data for similar requests. The data controller can thus identify a potential issue for further research and potential reconfiguration.

The analytic engine 437 and/or the analytic engine 444 can identify sets of objects in the iEoP response data 410, identify corresponding information for those objects in related investigative iPDR work package responses, and perform various analysis techniques (e.g., pattern matching, machine learning, etc.) to determine whether data patterns across data objects exhibit any patterns that might reflect a misconfiguration in one or more applications. The analytic engine 437 and/or the analytic engine 444 may identify patterns based on data subject characteristics (e.g., location), data subject requests, object types, transactional data types, application rules, or other aspects.

The analytic engine 437 and/or the analytic engine 444 can compare investigative iPDR work package responses and iEoP response data 410 to expected patterns based on rule information received by/for a given application. For instance, a given analytic engine may identify an expected pattern that data subjects in a first locale should have data retained for a certain amount of time (e.g., two years). The analytic engine may identify a potential issue in that data for some data subjects in the first locale stored by a first application have been stored for longer than the certain amount of time. The analytic engine can flag the potential issue in analysis results. The AI/ML engine 439 of the analytic engine 437 and the AI/ML engine 446 of the analytic engine 444 can be trained using iEoP response data and corresponding iPDR data for objects and transactional data known to be in compliance with respect to blocking and retention, for example, and once trained, can determine whether certain investigative iPDR work package responses reflect compliant or non-compliant results or patterns.

At 448, the DPI service 406 provides analysis results to the requester 402 in response to the request 404. As described in more detail below, in some examples, rather than providing analysis results to the requester 402, the DPI service 406 can alternatively or additionally provide at least some of the information in the investigative iPDR work package responses and/or iEoP/APD protocol results to the requester 402, to enable the requester to perform different types of analysis. Analysis results can include information that enables reviewers of the analysis results to understand why certain objects were blocked or not blocked, whether some objects should have been blocked but were not blocked, whether some objects were blocked and should not have been blocked, etc. Analysis results can include summary statistics for accuracy of iEoP response data, etc. In some cases, the analysis results can be used for audit purposes, in that the results can include supporting information for blocking decisions, can include or refer to all transactional data in landscape applications for certain data subject(s) along with blocking status in respective landscape systems.

FIG. 5 illustrates a swim lane diagram of an example process 500 for investigating data privacy integration protocols.

A requester 502 (e.g., requesting application or system) sends a request 504 to a DPI service 506 that requests an investigative analysis for analyzing DPI processing for a set of objects 507 (e.g., objects with object identifiers O1, O2, O3, . . . , O1000). The requester 502 can send the request 504 in response to an administrator input or automatically as part of periodic automatic processing, for example. The requester 502 can be a dedicated service, in some implementations (e.g., rather than a regular responder application). The object identifiers in the set of objects 507 can be determined by the requester 502 (or by the DPI service 506 or by an administrator) by identifying objects for which previous DPI protocol requests have been submitted in the past. As another example, an administrator can populate the set of objects 507 using an administrative interface to gather a set of objects for which to perform an investigation.

At 508, the DPI service 506 identifies a subset of objects 509 (e.g., corresponding to object identifiers O1, O2, . . . , O100) from the set of objects 507. For instance, as in the illustrated example, the DPI service 506 can identify up to a predetermined number (e.g., up to one hundred) objects for a given subset. As another example, the DPI service 506 can identify a subset corresponding to a certain percentage (e.g., 10%) of objects in the set of objects 507. In some implementations, the requester 502 specifies, in the request 504, a subset of objects for which investigation may occur rather than a full set of objects and requests investigation of other subsets, as described below.

At 510, the DPI service 506 identifies iEoP response data 511 from one or more protocol runs for iEoP protocol requests associated with the subset of objects 509. For example, the DPI service 506 can identify iEoP response data corresponding to one or more prior iEoP protocol runs that are identified based on information (e.g., one or more ticket identifiers) in the request 504. As another example, in some implementations, the DPI service 506 can, in response to the request 504, initiate a new iEoP protocol run for the subset of objects 509, receive and gather responses from relevant applications as the iEoP response data 510, and then identify the iEoP response data 511 for purposes of evaluation in response to the request 504.

At 512, the DPI service 506 identifies responder applications that responded to the iEoP protocol runs associated with the iEoP response data 511. For example, the DPI service 506 identify, as relevant responders 513, a first application 514 and a second application 516 but not a third application 518.

At 520, the DPI service 506 creates an investigative iPDR work package for use in investigating the prior iEoP protocol runs for the subset of objects 509. The DPI service 506 sends investigate work package copies 522 and 524 for the subset of objects 509 to the first application 514 and the second application 516, respectively. The DPI service 506 does not send the investigative iPDR work package to the third application 518, since the third application 518 is not included in the relevant responders 513.

At 528 and 530, the first application 514 and the second application 516, respectively, process the investigative iPDR work package for the subset of objects 509 by performing iPDR processing for each object in the subset of objects 509 according to any flag, options, or other content in the investigative iPDR work package. The first application 514 and the second application 516 can each include in respective investigative iPDR work package responses, respective sets of exported data for each object in the subset of objects 509 for which a respective application has personal data. As described above, a respective application can include, in a respective investigative iPDR work package response, metadata, is-currently-blocked indicators, application rule/configuration information, etc.

At 532 and 534, the first application 514 and the second application 516, respectively, each send an investigative iPDR work package response for the subset of objects 509 to the DPI service 506. The DPI service 506 can store received investigative iPDR work package responses as investigative iPDR work package responses 535.

At 536, the DPI service 506 provides the investigative iPDR work package responses 535 and the iEoP response data 511 to the requester 502. The DPI service 506 can also provide the investigative iPDR work package response information to an internal analytical engine or to an external analytical engine other than the requester 502. The DPI service 506 can also provide the iEoP response data 510 to the requester 502.

At 538, the requester 502 analyzes (or initiates analysis of) the received iPDR work package and iEoP response information. For example, the requester 502 can include an analytic engine 540. In some implementations, the analytic engine 540 includes an AI/ML engine 542. The analytic engine 540 (e.g., the AI/ML engine 542) can analyze the received iPDR work package and iEoP response information and generate analysis results 544. The analytic engine 540 can provide the analysis results 544 to an application 546, for review by an administrator, for example. In some implementations, the application 546 can present the received iPDR work package and iEoP response information to the administrator, and the administrator can perform analysis (e.g., in combination with or separate from analysis performed by the analytic engine 540). The analytic engine 540 can perform the same types of analysis and undergo the same types of training as described above for the analytic engines 437 and 444.

The analytic engine 540 or the administrator can, based on the analysis results 544, determine whether to request the DPI service 506 to create an investigative work package for a next subset of objects (e.g., objects with identifiers O101, O102, . . . , O200). In some cases and for some types of analysis, the analytic engine 540 may determine that enough investigative iPDR work package response information has been received to make certain conclusions and that analysis of a next set of objects is not necessary or requested. As an example, the analytic engine 540 may, using the AI/ML engine 542, identify, as or in the analysis results 544, certain patterns from analysis of the results obtained for objects in the subset of objects 509 (or, as potentially other object subsets are processed, results from multiple object subsets analyzed thus far). A pattern may be identified with a certain confidence such that the analytic engine 540 can determine that analyzing subsequent object subsets is not required (e.g., the pattern may be already sufficiently determined with sufficient confidence). In some cases, for example, the analytic engine 540 can determine that at least one misconfiguration is identified of at least a certain severity that the analytic engine 540 determines to create an alert regarding the misconfiguration without requesting processing of other sets of objects.

If the analytic engine 540 or the administrator determines to request the DPI service 506 to create an investigative work package for the next subset of objects, the requester 502 can respond to the sending of the investigative work package information sent at step 536 with an indication to process a next object subset (and DPI can identify and process a next object subset). In implementations in which the requester 502 identifies object subsets, the requester 502 can send another request for a next object subset to the DPI service 506.

The DPI service 506 and the relevant responders can process a next object subset (e.g., for objects with identifiers O101, O102, . . . , O200), similar to processing described above for steps/items 508 to 536. If the requester 502 determines that processing of a next object subset is not needed or desired, the requester 502 can either respond to the sending of the investigative work package information sent at step 536 with an indication that the request 504 is satisfied or the requester 502 can simply not send a request for processing of a next object subset.

Figure 6:
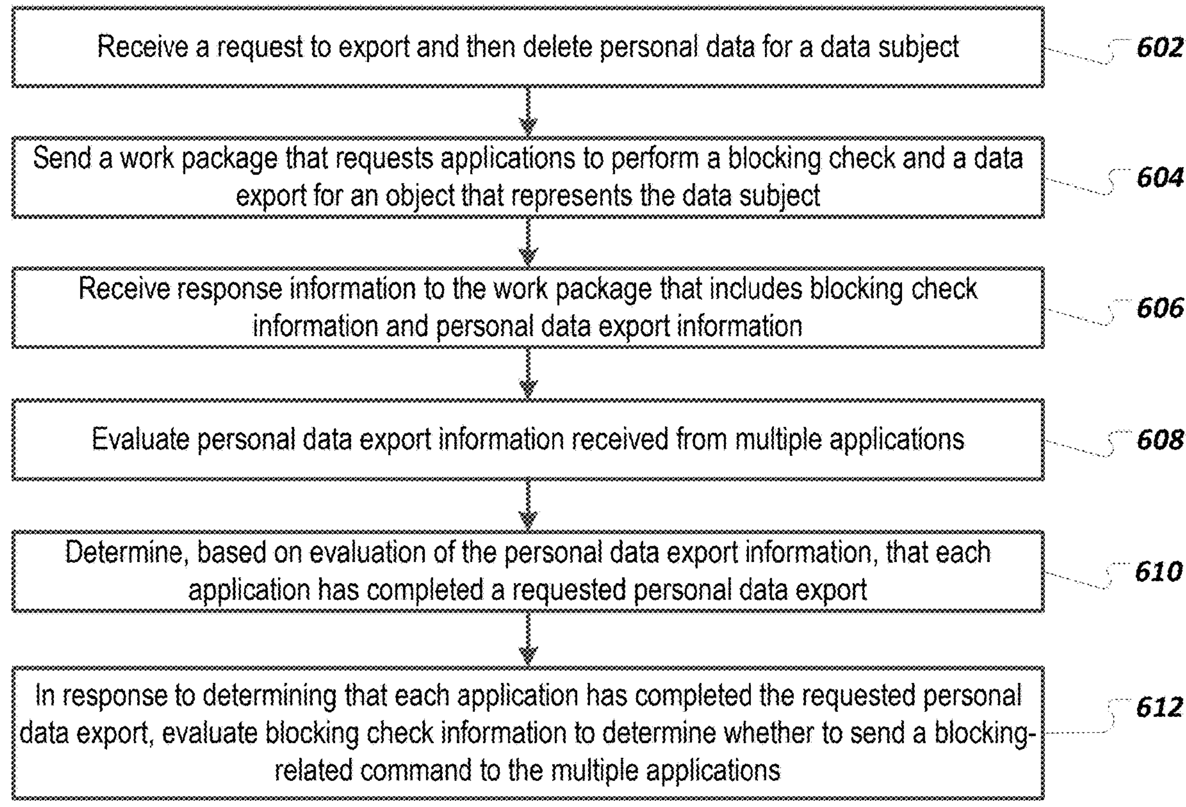
FIG. 6 is a flowchart of an example method for coordinating personal data export and personal data deletion.

FIG. 6 is a flowchart of an example method 600 for coordinating personal data export and personal data deletion. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the data privacy integration service 117 of FIG. 1.

At 602, a request is received, at a data privacy integration service that manages data privacy protocols for applications in a multiple-application landscape, to export and then delete personal data for a data subject. The data subject may wish to do an export and then immediately have a right-to-be-forgotten request be processed. The request being received at the data privacy integration service as a single request can result in resource savings and avoid certain undesirable situations, as described above.

In some cases, the data privacy integration service can determine, in response to the request, that at least one blocking protocol is in progress for the data subject in the multiple-application landscape. The data privacy integration service can send a command to multiple applications to stop the blocking protocol for the data subject. In some implementations, in response to receiving the request, the data privacy integration service can include an object representing the data subject on a hold list that prevents initiation of a blocking protocol for the data subject while the request is being processed.

At 604, the data privacy integration service sends, in response to the request, to multiple applications, a work package that requests a respective application to perform a blocking check and a data export for an object that represents the data subject. If the data privacy integration service has stopped any blocking protocols in response to the request, the data privacy integration service can determine that each application has stopped the blocking protocol and can then determine to send the work package that requests each application to perform the blocking check and the data export based on determining that each application has stopped the blocking protocol. If no blocking protocols are in progress for the data subject when the request is received, the data privacy integration service can send the work package after receiving the request.

The blocking check can be a request for an application to determine whether the object representing the data subject can or cannot be blocked in the application. A veto vote for an application can indicate that the application cannot block the object. As another example, the blocking check can include a purpose for which personal data may be processed and can be a request for an application to determine whether the purpose can be disassociated from the object representing the data subject.

At 606, response information to the work package is received, at the data privacy integration service and from the multiple applications, that includes blocking check information and personal data export information.

At 608, the data privacy integration service evaluates personal data export information received from the multiple applications.

At 610, the data privacy integration service determines, based on evaluation of the personal data export information, that each application of the multiple applications has completed a requested personal data export.

At 612, in response to determining that each application of the multiple applications has completed the requested personal data export, the data privacy integration service evaluates blocking check information received from multiple applications to determine whether to send a blocking-related command to the multiple applications. Evaluating the blocking check information can include determining whether any application has provided a veto vote for the object. The data privacy integration service can send, as the blocking-related command, in response to determining that no application has provided a veto vote for the object, a block command to each of the multiple applications that instructs a respective application to block the object. As another example, the data privacy integration service can determine to not send the block command in response to determining that at least one application has provided a veto vote for the object. In some cases, the data privacy integration service determines, for a first application, that the first application has not provided a veto vote based, at least in part, on the first application responding to the work package with an indication that no personal data is stored for the data subject.

When the blocking check is a request for an application to determine whether the purpose can be disassociated from the object representing the data subject, the data privacy integration service can send, as the blocking-related command, in response to determining that each of the multiple applications is able to disassociate the purpose from the object, a disassociate-purpose command to each of the multiple applications that instructs a respective application to disassociate the purpose from the object. As another example, the data privacy integration service can determine to not send the disassociate-purpose command in response to determining that at least one application is not able to disassociate the purpose from the object. When the disassociate-purpose command is sent and processed by an application, the application, after disassociating the purpose from the object, can block the object based on the object no longer having any associated purposes in the application.

Regarding the received personal data export information, the data privacy integration service can aggregate personal data for the data subject received from multiple applications and provide the aggregated personal data in response to the request.

When block-related commands are sent, the data privacy integration service can receive blocking statuses from applications in response to the block-related commands. The data privacy integration service can determine an overall blocking status based on received blocking statuses and provide the overall blocking status in response to the request.

In some cases, the data privacy integration service can receive a second request to export and then delete personal data for a second data subject. The data privacy integration service can determine that an exception condition exists for the second data subject, such as the second data subject being associated with a litigation hold or some other exceptional situation for which personal data can't currently be deleted for the second data subject. In response to determining that the exception condition exists for the second data subject, the data privacy integration service, can send in response to the second request, a response to the second request indicating that the request to export and then deleted personal data for the second data subject cannot be completed.

Figure 7:
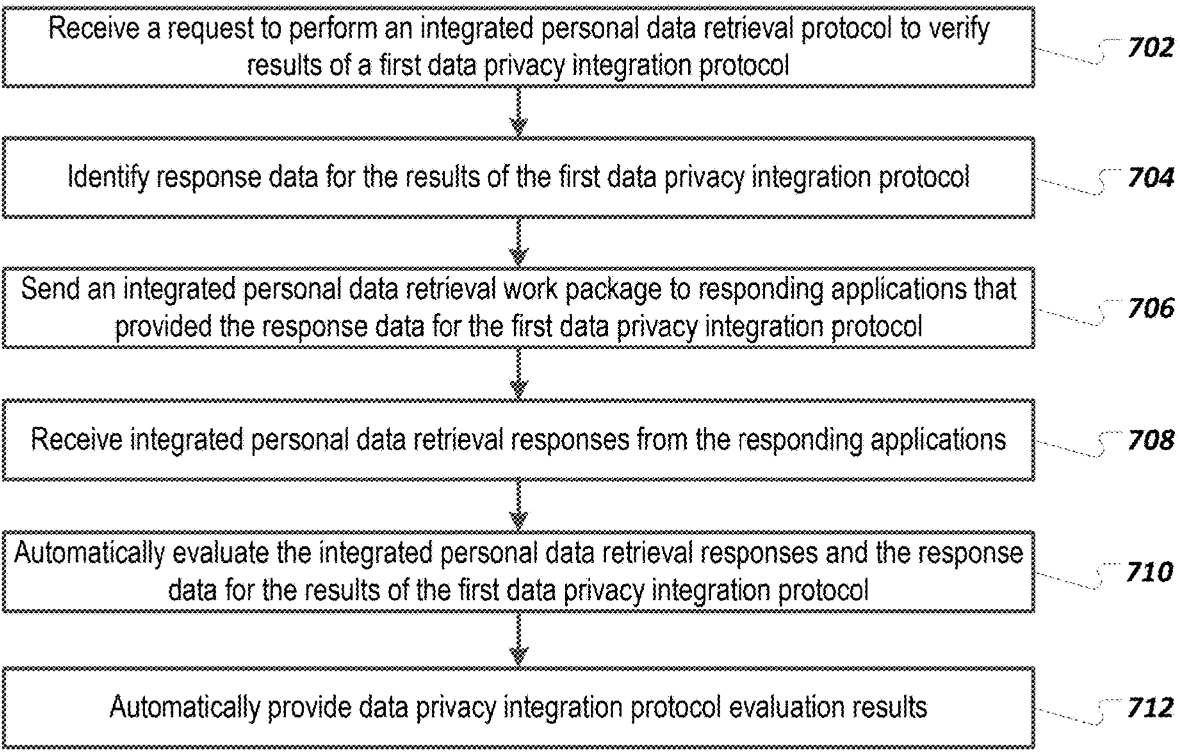
FIG. 7 is a flowchart of an example method for performing an integrated personal data retrieval protocol to verify results of another data privacy integration protocol.

FIG. 7 is a flowchart of an example method 700 for performing an integrated personal data retrieval protocol to verify results of another data privacy integration protocol. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the data privacy integration service 117 of FIG. 1.

At 702, a request is received, from a requester and by a data privacy integration service that integrates data privacy protocols across multiple applications in a landscape, to perform an integrated personal data retrieval protocol to verify results of a first data privacy integration protocol. The first data privacy integration protocol can be an integrated end of purpose protocol in which a respective responding application provides a vote for an object indicating whether the respective responding application can block the object. As another example, the first data privacy integration protocol can be an aligned purpose disassociation protocol in which a respective responding application provides a vote for an object indicating whether the respective responding application can disassociate a purpose from the object.

At 704, response data is identified, by the data privacy integration service, for the results of the first data privacy integration protocol. Responding applications that provided responses to the first data privacy integration protocol can be identified.

At 706, an integrated personal data retrieval work package is sent, by the data privacy integration service, to each application of the responding applications, that requests the application to generate a personal data export in response to the integrated personal data retrieval work package. The integrated personal data retrieval work package can include an indicator that indicates that the integrated personal data retrieval protocol is for investigative or verification purposes. In some examples, the integrated personal data retrieval work package includes an indicator that indicates that a responding application can include, in an integrated personal data retrieval response, metadata describing personal data rather than full copies of personal data.

At 708, the data privacy integration service receives, from responding applications, in response to the integrated personal data retrieval work package, integrated personal data retrieval responses. A responding application can include, in an integrated personal data retrieval response, information indicating whether exported personal data is blocked. A responding application includes, in an integrated personal data retrieval response, retention period information that can include retention period length or retention period assignment rules configured in the responding application.

At 710, the data privacy integration service automatically evaluates the integrated personal data retrieval responses and the response data for the results of the first data privacy integration protocol to generate data privacy integration protocol evaluation results. Automatically evaluating the integrated personal data retrieval responses and the response data for the results of the first data privacy integration protocol can include performing the evaluating using an artificial intelligence engine.

The data privacy integration protocol evaluation results can include one or more of the following: 1) data describing why certain objects were blocked or not blocked as a result of the first data privacy integration protocol; 2) data describing a first inconsistency in that at least one object expected to be blocked after the first data privacy integration protocol is not blocked; 3) data describing a second inconsistency in that at least one object expected to not be blocked after the first data privacy integration protocol is blocked; or 4) an application misconfiguration in a first responding application that is determined based on the first inconsistency and/or the second inconsistency.

At 712, the data privacy integration service automatically provides, to the requester, the data privacy integration protocol evaluation results.

The investigative iPDR protocol can be integrated with the iEoP or APD protocols in different ways. For instance, while the investigative iPDR protocol can be performed after an iEoP or APD execution, as described for the method 700, the investigative iPDR protocol can be automatically executed prior to an iEoP/APD execution, such as in cases: (1) whenever one of the iEoP or APD protocol is executed, or (2) when a certain flag is set during the creation of an iEoP/APD ticket. the investigative iPDR protocol can be executed prior to an iEoP/APD execution during a setup phase of iEoP/APD in the landscape, during which processing resources can be expended to verify the outcome of iEoP/APD protocol runs. As another example, the investigative iPDR protocol can be automatically executed prior to an iEoP/APD execution to produce data to very subsequent iEoP/APD executions after landscape or application configuration data has changed. In some cases, the investigative iPDR protocol can be ran to verify iEoP/APD results that ran with those protocols being executed in a "check-only" mode (e.g., a mode in which the DPI service asks for can-block or can-disassociate-purpose votes from applications but does not send out subsequent block or disassociate purpose commands, respectively).

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

Example 2. The computer-implemented method of Example 1, wherein the blocking check is a request for an application to determine whether the object representing the data subject can or cannot be blocked in the application, wherein a veto vote for an application indicates that the application cannot block the object.

Example 3. The computer-implemented method of any of the preceding examples, wherein evaluating blocking check information comprises determining whether any application has provided a veto vote for the object.

Example 4. The computer-implemented method of any of the preceding examples, further comprising, sending, as the blocking-related command, by the data privacy integration service, in response to determining that each application of the multiple applications has provided a non-veto vote for the object, a block command to each of the multiple applications that instructs a respective application to block the object.

Example 5. The computer-implemented method of any of the preceding examples, wherein each application of the multiple applications successfully completes the block command and deletes the object after a respective retention period for the object expires.

Example 6. The computer-implemented method of any of the preceding examples, further comprising determining, by the data privacy integration service, to not send the block command in response to determining that at least one application has provided a veto vote for the object or that at least one application has failed to provide a vote for the object.

Example 7. The computer-implemented method of any of the preceding examples, wherein the data privacy integration service determines, for a first application, that the first application has not provided a veto vote based on the first application responding to the work package with an indication that the first application does not store personal data related to the data subject.

Example 8. The computer-implemented method of any of the preceding examples, wherein the blocking check includes a purpose for which personal data may be processed and is a request for an application to determine whether the purpose can be disassociated from the object representing the data subject.

Example 9. The computer-implemented method of any of the preceding examples, further comprising, sending, as the blocking-related command, by the data privacy integration service, in response to determining that each of the multiple applications is able to disassociate the purpose from the object, a disassociate-purpose command to each of the multiple applications that instructs a respective application to disassociate the purpose from the object.

Example 10. The computer-implemented method of any of the preceding examples, further comprising determining, by the data privacy integration service, to not send the disassociate-purpose command in response to determining that at least one application is not able to disassociate the purpose from the object.

Example 11. The computer-implemented method of any of the preceding examples, wherein a first application, after disassociating the purpose from the object, blocks the object based on the object no longer having any associated purposes in the first application.

Example 12. The computer-implemented method of any of the preceding examples, further comprising:

receiving, by the data privacy integration service, blocking statuses from applications in response to block-related commands;

determining, by the data privacy integration service an overall blocking status based on received blocking statuses; and providing, by the data privacy integration service, the overall blocking status in response to the request.

Example 13. The computer-implemented method of any of the preceding examples, further comprising:

aggregating, by the data privacy integration service, personal data for the data subject received from multiple applications; and providing, by the data privacy integration service, in response to the request, aggregated personal data for the data subject.

Example 14. The computer-implemented method of any of the preceding examples, further comprising:

receiving, at the data privacy integration service, a second request to export and then delete personal data for a second data subject;

determining, by the data privacy integration service, that an exception condition exists for the second data subject; and in response to determining that the exception condition exists for the second data subject, sending, by the data privacy integration service, in response to the second request, a response to the second request indicating that the request to export and then deleted personal data for the second data subject cannot be completed.

Example 15. The computer-implemented method of any of the preceding examples, wherein determining that the exception condition exists for the second data subject comprises determining, by the data privacy integration service, that a litigation hold exists for the second data subject that prevents deletion of personal data for the second data subject.

Example 16. The computer-implemented method of any of the preceding examples, further comprising:

determining, by the data privacy integration service, in response to the request, that at least one blocking protocol is in progress for the data subject in the multiple-application landscape;

sending, by the data privacy integration service, a command to multiple applications to stop the blocking protocol for the data subject;

determining, by the data privacy integration service, that each application has stopped the blocking protocol; and determining, by the data privacy integration service, to send the work package that requests each application to perform the blocking check and the data export based on determining that each application has stopped the blocking protocol.

Example 17. The computer-implemented method of any of the preceding examples, wherein determining, by the data privacy integration service, that at least one blocking protocol is in progress for the data subject comprises:

determining that a first application has, as part of a blocking protocol, blocked but not deleted the object; and determining that a second application has, as part of the blocking protocol, blocked and also deleted the object;

the method further comprising:

sending, by the data privacy integration service, an unblock command for the object to the first application; and sending, by the data privacy integration service, a redistribute object command for the object to a distribution service requesting the distribution service to redistribute the object to the second application.

Example 18. The computer-implemented method of claim 1, further comprising including, in response to the request, by the data privacy integration service, the object representing the data subject on a hold list that prevents initiation of a blocking protocol for the data subject while the request is being processed.

Example 19. A system, comprising:

a computing device; and a computer-readable storage device coupled to the computing device and having instructions stored thereon which, when executed by the computing device, cause the computing device to perform operations comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

Example 20. A non-transitory computer-readable storage medium coupled to one or more processors and having instructions stored thereon which, when executed by the one or more processors, cause the one or more processors to perform operations comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

What is claimed is:

1. A computer-implemented method comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

2. The computer-implemented method of claim 1, wherein the blocking check is a request for an application to determine whether the object representing the data subject can or cannot be blocked in the application, wherein a veto vote for an application indicates that the application cannot block the object.

3. The computer-implemented method of claim 2, wherein evaluating blocking check information comprises determining whether any application has provided a veto vote for the object.

4. The computer-implemented method of claim 3, further comprising, sending, as the blocking-related command, by the data privacy integration service, in response to determining that each application of the multiple applications has provided a non-veto vote for the object, a block command to each of the multiple applications that instructs a respective application to block the object.

5. The computer-implemented method of claim 4, wherein each application of the multiple applications successfully completes the block command and deletes the object after a respective retention period for the object expires.

6. The computer-implemented method of claim 4, further comprising determining, by the data privacy integration service, to not send the block command in response to determining that at least one application has provided a veto vote for the object or that at least one application has failed to provide a vote for the object.

7. The computer-implemented method of claim 6, wherein the data privacy integration service determines, for a first application, that the first application has not provided a veto vote based on the first application responding to the work package with an indication that the first application does not store personal data related to the data subject.

8. The computer-implemented method of claim 1, wherein the blocking check includes a purpose for which personal data may be processed and is a request for an application to determine whether the purpose can be disassociated from the object representing the data subject.

9. The computer-implemented method of claim 8, further comprising, sending, as the blocking-related command, by the data privacy integration service, in response to determining that each of the multiple applications is able to disassociate the purpose from the object, a disassociate-purpose command to each of the multiple applications that instructs a respective application to disassociate the purpose from the object.

10. The computer-implemented method of claim 9, further comprising determining, by the data privacy integration service, to not send the disassociate-purpose command in response to determining that at least one application is not able to disassociate the purpose from the object.

11. The computer-implemented method of claim 9, wherein a first application, after disassociating the purpose from the object, blocks the object based on the object no longer having any associated purposes in the first application.

12. The computer-implemented method of claim 1, further comprising:

receiving, by the data privacy integration service, blocking statuses from applications in response to block-related commands;

determining, by the data privacy integration service an overall blocking status based on received blocking statuses; and providing, by the data privacy integration service, the overall blocking status in response to the request.

13. The computer-implemented method of claim 1, further comprising:

aggregating, by the data privacy integration service, personal data for the data subject received from multiple applications; and providing, by the data privacy integration service, in response to the request, aggregated personal data for the data subject.

14. The computer-implemented method of claim 1, further comprising:

receiving, at the data privacy integration service, a second request to export and then delete personal data for a second data subject;

determining, by the data privacy integration service, that an exception condition exists for the second data subject; and in response to determining that the exception condition exists for the second data subject, sending, by the data privacy integration service, in response to the second request, a response to the second request indicating that the request to export and then deleted personal data for the second data subject cannot be completed.

15. The computer-implemented method of claim 14, wherein determining that the exception condition exists for the second data subject comprises determining, by the data privacy integration service, that a litigation hold exists for the second data subject that prevents deletion of personal data for the second data subject.

16. The computer-implemented method of claim 1, further comprising:

determining, by the data privacy integration service, in response to the request, that at least one blocking protocol is in progress for the data subject in the multiple-application landscape;

sending, by the data privacy integration service, a command to multiple applications to stop the blocking protocol for the data subject;

determining, by the data privacy integration service, that each application has stopped the blocking protocol; and determining, by the data privacy integration service, to send the work package that requests each application to perform the blocking check and the data export based on determining that each application has stopped the blocking protocol.

17. The computer-implemented method of claim 16, wherein determining, by the data privacy integration service, that at least one blocking protocol is in progress for the data subject comprises:

determining that a first application has, as part of a blocking protocol, blocked but not deleted the object; and determining that a second application has, as part of the blocking protocol, blocked and also deleted the object;

the method further comprising:

sending, by the data privacy integration service, an unblock command for the object to the first application; and sending, by the data privacy integration service, a redistribute object command for the object to a distribution service requesting the distribution service to redistribute the object to the second application.

18. The computer-implemented method of claim 1, further comprising including, in response to the request, by the data privacy integration service, the object representing the data subject on a hold list that prevents initiation of a blocking protocol for the data subject while the request is being processed.

19. A system, comprising:

a computing device; and a computer-readable storage device coupled to the computing device and having instructions stored thereon which, when executed by the computing device, cause the computing device to perform operations comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

20. A non-transitory computer-readable storage medium coupled to one or more processors and having instructions stored thereon which, when executed by the one or more processors, cause the one or more processors to perform operations comprising:

receiving, at a data privacy integration service that manages data privacy protocols for applications in a multiple-application landscape, a request to export and then delete personal data for a data subject;

sending, in response to the request, by the data privacy integration service and to multiple applications, a work package that requests a respective application to perform a blocking check and a data export for an object that represents the data subject;

receiving, at the data privacy integration service, from the multiple applications, response information to the work package that includes blocking check information and personal data export information;

evaluating, by the data privacy integration service, personal data export information received from the multiple applications;

determining, by the data privacy integration service and based on evaluation of the personal data export information, that each application of the multiple applications has completed a requested personal data export; and in response to determining that each application of the multiple applications has completed the requested personal data export, evaluating, by the data privacy integration service, blocking check information received from multiple applications to determine whether to send a blocking-related command to the multiple applications.

* * * * *